(12) United States Patent
Sun et al.

(10) Patent No.: US 7,887,771 B2
(45) Date of Patent: Feb. 15, 2011

(54) CARBON NANORINGS MANUFACTURED FROM TEMPLATING NANOPARTICLES

(75) Inventors: Gongquan Sun, Liao Ning Province (CN); Shuihua Tang, Liao Ning Province (CN); Shiguo Sun, Liao Ning Province (CN); Qin Xin, Liao Ning Province (CN); Changkun Liu, Lawrenceville, NJ (US); Bing Zhou, Cranbury, NJ (US)

(73) Assignees: Headwaters Technology Innovation, LLC, Lawrenceville, NJ (US); Dalian Institute, Liao Niag Province (CN)

( * ) Notice: Subject to any disclaimer, the term of this patent is extended or adjusted under 35 U.S.C. 154(b) by 236 days.

(21) Appl. No.: 11/539,120

(22) Filed: Oct. 5, 2006

(65) Prior Publication Data

US 2010/0135893 A1 Jun. 3, 2010

Related U.S. Application Data

(60) Provisional application No. 60/724,323, filed on Oct. 6, 2005, provisional application No. 60/724,315, filed on Oct. 6, 2005.

(51) Int. Cl.
*C01B 31/00* (2006.01)
*C01B 31/04* (2006.01)
*C09C 1/44* (2006.01)
*C09C 1/46* (2006.01)
*B01J 21/18* (2006.01)

(52) U.S. Cl. .............. 423/445 R; 423/447.4; 423/447.5; 423/448; 502/180; 502/182

(58) Field of Classification Search .......... 423/445 B, 423/445 R, 447.1, 447.4, 447.5, 447.9, 448; 502/180, 182
See application file for complete search history.

(56) References Cited

U.S. PATENT DOCUMENTS

| | | | |
|---|---|---|---|
| 4,336,238 A | 6/1982 | Dalton, Jr. et al. | 423/584 |
| 4,347,231 A | 8/1982 | Michaelson | 423/584 |
| 4,347,232 A | 8/1982 | Michaelson | 423/584 |
| 4,374,105 A | 2/1983 | Anderson et al. | 423/230 |

(Continued)

FOREIGN PATENT DOCUMENTS

| | | |
|---|---|---|
| EP | 0544513 | 6/1993 |
| EP | 0852246 | 7/1998 |
| EP | 1502609 | 2/2005 |
| EP | 1655266 | 5/2006 |

(Continued)

OTHER PUBLICATIONS

T. Hyeon, S. Han, Y.-E. Sung, K.-W. Park, Y.-W. Kim, Angew. Chem. Int. Ed. 2003, 42, 4352-4356.*

(Continued)

*Primary Examiner*—Scott Kastler
*Assistant Examiner*—Brian Walck
(74) *Attorney, Agent, or Firm*—Workman Nydegger

(57) ABSTRACT

Methods for manufacturing carbon nanostructures include 1) forming intermediate carbon nanostructures by polymerizing a carbon precursor in the presence of templating nanoparticles, 2) carbonizing the intermediate carbon nanostructures to form an intermediate composite nanostructure, and 3) removing the templating nanoparticles from the intermediate composite nanostructure to form carbon nanorings. The carbon nanorings manufactured using the foregoing steps have one or more carbon layers forming a wall that defines a generally annular nanostructure having a hole. The length of the nanoring is less than or about equal to the outer diameter thereof. The carbon nanostructures are well-suited for use as a fuel cell catalyst support. The carbon nanostructures exhibit high surface area, high porosity, high graphitization, and facilitate mass transfer and electron transfer in fuel cell reactions. Carbon nanorings manufactured according to the present invention can be used as a substitute for more expensive and likely more fragile carbon nanotubes.

22 Claims, 4 Drawing Sheets

U.S. PATENT DOCUMENTS

| | | | |
|---|---|---|---|
| 5,296,543 A | 3/1994 | Kasowski et al. | |
| 5,462,680 A | 10/1995 | Brois et al. | |
| 5,591,312 A | 1/1997 | Smalley | 204/157.41 |
| 5,612,021 A | 3/1997 | Mellul | |
| 5,643,990 A | 7/1997 | Uehara et al. | 524/496 |
| 5,830,326 A | 11/1998 | Iijima | 204/173 |
| 5,882,621 A | 3/1999 | Doddapaneni et al. | |
| 5,882,810 A | 3/1999 | Mussell et al. | |
| 6,231,980 B1 | 5/2001 | Cohen et al. | 428/403 |
| 6,515,845 B1 | 2/2003 | Oh et al. | 361/502 |
| 6,551,960 B1 | 4/2003 | Laine et al. | 502/327 |
| 6,589,312 B1 | 7/2003 | Snow et al. | 75/245 |
| 6,673,953 B2 | 1/2004 | Keller et al. | 556/143 |
| 6,683,783 B1 | 1/2004 | Smalley et al. | 361/502 |
| 6,689,835 B2 | 2/2004 | Amarasekera et al. | 524/495 |
| 6,692,718 B1 | 2/2004 | Osawa | 423/448 |
| 6,712,864 B2 | 3/2004 | Horiuchi et al. | 23/314 |
| 6,756,026 B2 | 6/2004 | Colbert et al. | |
| 6,835,591 B2 | 12/2004 | Rueckes et al. | 438/99 |
| 6,841,509 B1 | 1/2005 | Hwang et al. | |
| 6,866,801 B1 | 3/2005 | Mau et al. | 264/29.1 |
| 6,936,233 B2 | 8/2005 | Smalley et al. | |
| 2002/0192141 A1 | 12/2002 | Little | 423/447.3 |
| 2003/0004058 A1 | 1/2003 | Li et al. | 423/447.3 |
| 2003/0100653 A1 | 5/2003 | Chacko | 524/99 |
| 2003/0166762 A1 | 9/2003 | Koevoets et al. | 523/351 |
| 2003/0185741 A1 | 10/2003 | Matyjaszewski et al. | 264/29.2 |
| 2004/0005269 A1 | 1/2004 | Huang et al. | 423/447.3 |
| 2004/0009346 A1 | 1/2004 | Jang et al. | |
| 2004/0047798 A1* | 3/2004 | Oh et al. | 423/414 |
| 2004/0069454 A1 | 4/2004 | Bonsignore et al. | |
| 2004/0110005 A1 | 6/2004 | Choi et al. | 428/408 |
| 2004/0130066 A1 | 7/2004 | Koide et al. | |
| 2004/0136894 A1 | 7/2004 | Yoshizawa et al. | 524/495 |
| 2004/0141906 A1 | 7/2004 | Polverejan et al. | 423/418.2 |
| 2004/0176513 A1 | 9/2004 | Cakmak et al. | |
| 2004/0185251 A1 | 9/2004 | Wang et al. | 428/689 |
| 2004/0214177 A1 | 10/2004 | Bension | 435/6 |
| 2004/0224163 A1 | 11/2004 | Tobita et al. | 428/413 |
| 2004/0234444 A1 | 11/2004 | Shaffer et al. | |
| 2005/0009694 A1* | 1/2005 | Watts et al. | 502/304 |
| 2005/0016839 A1 | 1/2005 | Horne et al. | 428/248.1 |
| 2005/0032635 A1 | 2/2005 | Yu et al. | |
| 2005/0037255 A1 | 2/2005 | Ozaki et al. | 429/128 |
| 2005/0039382 A1 | 2/2005 | Blanchard et al. | |
| 2005/0049355 A1 | 3/2005 | Tang et al. | 524/496 |
| 2005/0070657 A1 | 3/2005 | Elkovitch et al. | 524/495 |
| 2005/0127782 A1 | 6/2005 | Endo et al. | 310/323.02 |
| 2005/0128884 A1 | 6/2005 | Endo et al. | 368/160 |
| 2005/0136079 A1 | 6/2005 | Burangulov et al. | |
| 2005/0142428 A1 | 6/2005 | Daimon et al. | |
| 2005/0147746 A1 | 7/2005 | Dubin et al. | |
| 2005/0170169 A1 | 8/2005 | Watanabe et al. | 428/292.1 |
| 2005/0181285 A1 | 8/2005 | Sakamoto et al. | |
| 2005/0228109 A1 | 10/2005 | Chandra et al. | 524/495 |
| 2005/0245667 A1 | 11/2005 | Harmon et al. | 522/116 |
| 2006/0062712 A1 | 3/2006 | Pak et al. | |
| 2006/0133981 A1 | 6/2006 | Jaroniec et al. | |
| 2006/0137487 A1 | 6/2006 | McKinnon et al. | |
| 2006/0155376 A1 | 7/2006 | Asgari | |

FOREIGN PATENT DOCUMENTS

| | | |
|---|---|---|
| JP | 8325504 | 12/1996 |
| JP | 2002338219 | 11/2002 |
| JP | 2003054922 | 2/2003 |
| JP | 2004339041 | 2/2004 |
| JP | 2004224579 | 8/2004 |
| JP | 2004331929 | 11/2004 |
| JP | 2004339407 | 12/2004 |
| JP | 2005074472 | 3/2005 |
| JP | 2005133047 | 5/2005 |
| WO | WO00/24816 | 5/2000 |
| WO | 2004/087565 | 10/2004 |
| WO | WO2005/023708 | 3/2005 |
| WO | WO2005089390 | 9/2005 |

OTHER PUBLICATIONS

Hu, et al., "Direct Synthesis of Uniform Hollow Carbon Spheres by a Self-Assembly Template Approach" *The Royal Society of Chemistry 2002*, pp. 1948-1949 (Aug. 1, 2002).

Xu, et al., "A Novel Route to Hollow and Solid Carbon Spheres" *Letters to the Editor / Carbon 43*(2005), pp. 1090-1092 (Jan. 6, 2005).

Yoshizawa, et al., "TEM and Electron Tomography Studies of Carbon Nanospheres for Lithium Secondary Batteries" *Science Direct 44* (2006), pp. 2558-2564 (Jul. 14, 2006).

Wu, et al., "Necklace-like Hollow Carbon Nanospheres from the Pentagon-Including Reactants: Synthesis and Electrochemical Properties" *Inorganic Chemistry*, vol. 45, pp. 8543-8550 (Nov. 21, 2006).

Sun et al., "Colloidal Carbon Spheres and Their Core/Shell Structures with Noble-Metal Nanoparticles", Angewandte Chemie International Edition, WILEY-VCH Verlag GmbH & Co. KGaA, 2004, vol. 43, Issue 5, pp. 597-6501.

Qiao et al., "Carbon nanospheres produced in an arc-discharge process", Carbon 44 (2006) 158-193, available online Sep. 13, 2005.

Garrigue et al., "Top-Down Approach for the Preparation of Colloidal Carbon Nanoparticles", Chemical Materials 2004, 16, 2984-2986, available online Jul. 17, 2007.

Mukhopadhyay, Kingsuk, "Bulk Production of quasi aligned carbon nanotube bundles by the catalytic chemical vapour deposition (ccvd) method", Apr. 2, 1999, Chemical Physics Letters, vol. 303, pp. 117-124.

Office Action dated Jan. 21, 2009 cited in U.S. Appl. No. 11/244,521.

Office Action dated Nov. 6, 2008 cited in U.S. Appl. No. 11/539,042.

Office Action dated Apr. 8, 2009 cited in U.S. Appl. No. 11/539,042.

Office Action dated Aug. 14, 2009 cited in U.S. Appl. No. 11/539,042.

Office Action dated Nov. 6, 2009 cited in U.S. Appl. No. 11/244,521.

Notice of Allowance dated Jan. 13, 2010 cited in U.S. Appl. No. 11/539,042.

Office Action dated Jul. 9, 2010 in U.S. Appl. No. 11/244,521.

Hyperion Catalysis, "Preservation of Physical Properties in Molded Parts Using Compounds with FIBRIL™ Nanotubes", Hyperion Catalysis International Inc. website www.hyperioncatalysis.com, Article available as of at least Nov. 2006.

Office Action dated May 20, 2010 cited in U.S. Appl. No. 11/614,006.

Li, et al., "Carbon Nanotubes as Support for Cathode Catalyst of a Direct Methanol Fuel Cell," *Letters to the Editor/Carbon 40*, Dalian University of Technology, pp. 787-803 (Jan. 18, 2002).

Li, et al., "Preparation and Characterization of Multiwalled Carbon Nanotube-Supported Platinum for Cathode Catalysts of Direct Methanol Fuel Cells," *J. Phys. Chem*, B, vol. 107, pp. 6292-6299 (Jun. 6, 2003).

Lordi, et al., "Method for Supporting Platinum on Single-Walled Carbon Nanotubes for a Selective Hydrogenation Catalyst," *Chem. Mater.*, vol. 13, pp. 733-737 (Feb. 10, 2001).

Ohtsuka, Yasui, et al., "Char-Nitrogen Functionality and Interactions Between the Nitrogen and Iron I the Iron-Catalyzed Conversion Process of Coal Nitrogen to $N_2$," Research Center for Organic Resources and Materials Chemistry, Institute for Chemical Reaction Science, Tohoku University, Sendai, Japan, pp. 1356-1362 (May 6, 1998).

Matsumoto, et al., "Reduction of Pt usage in fuel cell electrocatalysts with carbon nanotube electrodes," *Chem. Commun., The Royal Society of Chemistry* 2004, 2004, pp. 840-841.

Li, et al., "Homogeneous and controllable Pt particles deposited on multi-wall carbon nanotubes as cathode catalyst for direct methanol fuel cells," *Letters to the Editor/Carbon 42*, Dalian University of Technology, pp. 436-439 (2004).

Han, Sangjin, et al., "Simple Solid-Phase Synthesis of Hollow Graphitic Nanoparticles and their Appliation to Direct Methanol Fuel Cell Electrodes," *Adv Mater.* 2003, 15, No. 22, Nov. 17, pp. 1922-1925.

Hod, Oded, et al., "Carbon nanotube closed-ring structures", *Physical Review*, B 67, 195408 (2003).

Wang, Zhong L., et al., "A rich family of slinky materials," *Materials Today*, Apr. 2004, p. 7.

Zhen Liu, et al., "Formation of nanoparticles rings on heterogeneous soft surfaces," *IOP Electronic Journals*, Nanotechnology, Nov. 11, 2004.

Bell, Linda, Editor/Publisher, *Nanotech Briefs*, vol. 1, No. 1, (Jan. 2004) www.nanotechbriefs.com.

Drzal, Lawrence T., "Nanotechnology Applications for Green Manufacturing," Michigan State University, College of Engineering, CMSC, Aug. 18, 2004.

Hester, J.R., et al., "Nanoparticle-templated carbon nanotube ring nucleus formation," *Applied Physics Letters*, (Apr. 8, 2002) vol. 80, No. 14, p. 2580-2.

Ibarra, M. R., "Magnetism of Nanometric 3d-Metal Particles in Carbon Cages: Possible Relevance for Biomedical Applications," presentation, Jun. 12, 2003.

Yong, K. Kim, et al., Nanocomposite Fibers, National Textile Center Annual Report: Nov. 2003; pp. 1-9.

Developing Application in Plastics, Nanotubes as a Conductive Additive in Elastomers; Hyperion Catalysis; hppt:/www.fibrils.com/developing2.htm, Available as of at least Nov. 7, 2005.

Max Planck Research, Spicing up Styrene with Nano-Onions; Jan. 2003.

Bagci, V.M.K., "Metal nanoring and tube formation on carbon nanotubes", Dept Of Phys., Bilkent Univ., Ankara, Turkey, Jul. 18, 2002.

Kuznetsova, A., et al., Physical adsorption of xenon in open single walled carbon nanotubes: Observation of a quasi-one-dimensional confined Xe phase, Journal of Chemical Physics, vol. 112, No. 21, 9590-9598, Jun. 1, 2000.

Mawhinney, Douglas B., et al., "Infared Spectral Evidence for the Etching of Carbon Nanotubes: Ozone Oxidation at 298 K", J. Am. Chem. Soc. (2000), 122, 2383-2384, published on web Feb. 29, 2000.

Kuznetsova, A., et al., "Enhancement of adsorption inside of single-walled nanotubes: opening the entry ports", Chemical Physics Letters 321, (2000), 292-296.

Kuznetsova, A., et al., "Oxygen-Containing Functional Groups on Single-Wall Carbon Nanotubes: NEXAFS and Vibrational Spectroscopic Studies", J. Am. Chem. Soc. (2001), 123, 10699-10704, published on web Oct. 9, 2001.

Fuertes, Antonio B. and Centeno, Teresa A., "Mesoporous carbons with graphitic structures fabricated by using porous silica materials as templates and iron-impregnated polypyrrole as precursor", J. Mater. Chem, (2005), 15, 1079-1083.

Guozhang, W., et al., "Entropy Penalty-Induced Self-Assembly in Carbon Black or Carbon Fiber Filled Polymer Blends", Macromolecules, (2002), vol. 35, No. 3, 945-951, published on the web Dec. 29, 2001.

Simonyam, Vahan V. and Johnson, J. Karl, "Hydrogen storage in carbon nanotubes and graphitic nanofibers", Journal of Alloys and Compounds, 330-332, (2002), 659-665.

Carmona, François and Ravier, Jérôme, "Electrical properties and mesostructure of carbon black-filled polymers", Pergamon, Carbon 40, (2002), 151-156.

Behler, K., et al., "Effect of thermal treatment on the structure of multi-walled carbon nanotubes", Journal of Nanoparticle Research, (2006), DOI 10/1007/s11051-006-9113-6.

Office Action dated Oct. 19, 2010 cited in U.S. Appl. No. 11/614,006.

* cited by examiner

CARBON NANORINGS MANUFACTURED FROM TEMPLATING NANOPARTICLES

CROSS-REFERENCE TO RELATED APPLICATION

This application claims the benefit under 35 U.S.C. §119 of U.S. provisional application Ser. No. 60/724,323, filed Oct. 6, 2005, and also of U.S. provisional application Ser. No. 60/724,315, filed Oct. 6, 2005, the disclosures of which are incorporated herein in their entirety.

BACKGROUND OF THE INVENTION

1. The Field of the Invention

The present invention relates generally to carbon nanorings and methods of making and using the nanorings.

2. The Relevant Technology

Fuel cells are electrochemical devices that convert chemical energy directly into electrical energy. A common type of fuel cell is the hydrogen fuel cell, which generates energy through a controlled reaction between hydrogen and oxygen. Recent improvements in fuel cells have led to the development of other types of fuel cells, such as direct methanol fuel cells (DMFCs) and direct ethanol fuel cells (DEFCs).

Essentially all fuel cells require a catalyst to increase the rate of the reaction in the fuel cell. Fuel cell catalysts are typically supported on a support material such as carbon black. Currently, most of the best performing fuel cell catalysts are supported on carbon black (Vulcan XC-72R), which is used for its reasonable surface area and number of mesopores.

Reaction rates in heterogeneous catalysts usually depend on five fundamental steps: (i) outer and inner diffusion of reactants, (ii) reactant adsorption, (iii) reaction on the active site (iv) desorption from the active site, and (v) product release from the catalyst. In conventional catalysts, steps (ii)-(v) have been rate determining steps. Improvements in steps (ii)-(v) can be obtained by improving the number of active sites on the catalyst. Improving the number of active sites can be accomplished without using more metal by reducing the size of the catalyst particles. Consequently, much effort has been made for reducing the size of catalyst particles.

In some cases, advancements in reducing the particle size have improved steps (ii)-(v) to such an extent that the diffusion of reactants (i.e., step (i)) is the rate limiting step. Attempts have been made to improve the performance of these catalysts by selecting new support materials that can improve mass transfer and/or electron transfer to the catalyst surface. New developments in carbon nanomaterials present a possible improvement in support materials over carbon black. For example, single-walled carbon nanotubes, multi-walled carbon nanotubes, carbon nanohorns, carbon nanocoils, and ordered meso-porous carbon have been investigated recently for their potential use as supports for fuel cell catalysts. Of these catalysts, the catalysts supported on carbon nanohorns and carbon nanocoils have exhibited higher performance than catalysts supported on carbon black.

BRIEF SUMMARY OF THE INVENTION

The present invention relates to novel carbon nanoring structures and methods for making the carbon nanoring structures. The carbon nanorings are sub-micron sized structures having a generally annular shape. At least one carbon layer forms a wall that defines a ring-like structure having a hole therethrough. In an exemplary embodiment, the wall is formed from a plurality of graphite layers, which are conductive.

The generally annular shape of the carbon nanorings of the present invention gives the nanorings unique properties. For example, the hole in each carbon nanoring gives the carbon nanoring material high porosity and high surface area. Consequently, the carbon nanoring can be advantageously used as a support material for a fuel cell catalyst. The high surface area allows for high metal loadings while the high porosity improves the performance of the fuel cell catalyst due to improved diffusion of reactants. Their high electrical conductivity allows the carbon nanorings to be used in the anode or the cathode of a fuel cell.

The present invention also includes novel methods for making carbon nanorings. The methods according to the present invention can include all or a portion of the following steps:

(i) providing a plurality of templating nanoparticles capable of providing a nucleation site for polymerization of a carbon precursor;

(ii) mixing the plurality of templating nanoparticles with the polymerizable carbon precursor and polymerizing the carbon precursor to form a plurality of intermediate nanostructures, each intermediate nanostructure being associated with at least one of the templating nanoparticles and having at least one structural feature that has been at least partially determined by the shape of the at least one templating nanoparticle;

(iii) carbonizing the intermediate nanostructures to form a plurality of composite nanostructures; and (iv) removing the plurality of templating nanoparticles from the plurality of composite nanostructures so as to yield a plurality of carbon nanorings.

In the method of the present invention, the dispersed templating nanoparticles are used as a template for making the carbon nanorings. When mixed with the carbon precursor, the templating nanoparticles provide a site where polymerization can begin or be enhanced. In an exemplary embodiment, the templating nanoparticles are mixed or treated with a catalyst to increase the rate of polymerization around the nanoparticles. The catalyst on the surface of the otherwise inert templating particles helps ensure that polymerization occurs near the surface of the nanoparticles such that intermediate nanostructures are formed around the templating nanoparticles. Because the carbon precursor is polymerized near the nanoparticle surface, the resulting intermediate nanostructure at least partially takes the shape of the nanoparticles.

In an exemplary embodiment, polymerizing the carbon precursor advantageously assists in creating individual intermediate nanostructures. The templating nanoparticles and/or the catalyst coated thereon cause the carbon precursor about the nanoparticles to polymerize more quickly than other areas of the carbon precursor. The intermediate nanostructures are formed and then polymerization is halted before the intermediate nanostructures have a chance to substantially polymerize together to form a single mass. In this manner, individual carbon nanorings can be formed from individual nanoparticles.

In an exemplary embodiment, the method of the present invention produces carbon nanostructures having a ring shape. The ring shape can give the carbon nanostructures beneficial properties such as high porosity and high surface area. Beneficial features such as these make the carbon nanostructures useful as a support material for a fuel cell catalyst. The high surface area allows for high metal loadings while the high porosity improves the performance of the fuel cell catalyst due to improved diffusion of reactants. Their high electrical conductivity allows the nanostructures to be used in the anode or the cathode of a fuel cell. Carbon nanostructures can be substituted for carbon nanotubes, which are typically more expensive and likely more fragile.

These and other advantages and features of the present invention will become more fully apparent from the following description and appended claims as set forth below.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

I. Introduction and Definitions

Figure 1C:
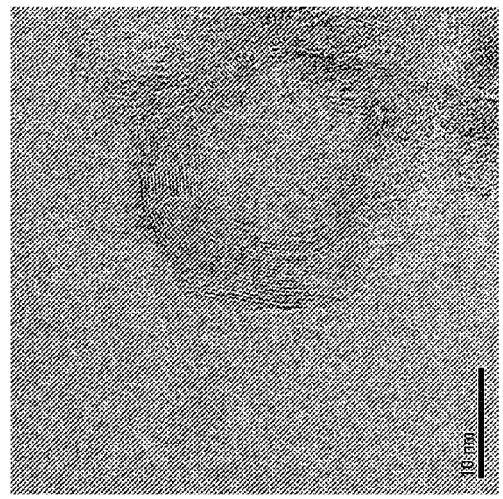
FIG. 1C is a high resolution TEM image showing yet a closer image of a carbon nanoring of FIG. 1A.

The present invention is directed to carbon nanorings, methods of making carbon nanorings, and the use of carbon nanorings as catalyst supports in the manufacture of fuel cell catalysts. Methods for manufacturing carbon nanorings generally include 1) forming an intermediate carbon nanoring by polymerizing a carbon precursor in the presence of a plurality of templating nanoparticles, 2) carbonizing the intermediate carbon nanoring to form a composite nanostructure, and 3) removing the templating nanoparticles from the composite nanostructure to leave carbon nanorings. The carbon nanorings manufactured using the foregoing steps have one or more carbon layers forming a wall that defines a generally annular nanostructure having a hole therethrough.

For purposes of the present invention, templating nanoparticles generally include inert particles that are not themselves capable of appreciably increasing the rate of polymerization of a carbon precursor or that are not necessary for initiation of polymerization. However, the inert particles may or may not have catalytic properties with respect to materials other than the carbon precursor. Non-limiting examples of inert nanoparticles include silica, alumina, magnesium oxide, magnesium hydroxide, zeolites, and ceria.

For purposes of the present invention, a catalyst material is any material that can appreciably increase the rate of polymerization and/or carbonization of the carbon precursor when combined therewith. The catalyst material can increase the rate of polymerization and/or carbonization by increasing initiation or by increasing the rate of another step. Non-limiting examples of catalyst materials include iron, cobalt, and/or nickel. Such catalyst materials can be mixed with and/or coated on inert particles to yield catalytic templating particles.

II. Components Used to Manufacture Carbon Nanorings

The following exemplary components can be used to carry out the above mentioned steps for manufacturing carbon nanorings according to the present invention.

A. Polymerizable Carbon Precursor

Any type of carbon material can be used as the carbon precursor of the present invention so long as it can disperse the templating particles, polymerize to form an intermediate nanostructure, and become carbonized by heat-treatment. Suitable compounds include single and multi-ring aromatic compounds such as benzene and naphthalene derivatives that have polymerizable functional groups. Also included are ring compounds that can form single and multi-ring aromatic compounds upon heating. Functional groups that can participate in polymerization include COOH, C=O, OH, C=C, $SO_3$, $NH_2$, SOH, N=C=O, and the like.

The polymerizable carbon precursor can be a single type of molecule (e.g., a compound that can polymerize with itself), or the polymerizable carbon precursor can be a combination of two or more different compounds that co-polymerize together. For example, in an exemplary embodiment, the carbon precursor can be a resorcinol-formaldehyde gel. In this two compound embodiment, the formaldehyde acts as a cross-linking agent between resorcinol molecules by polymerizing with the hydroxyl groups of the resorcinol molecules.

Other examples of suitable polymerizable precursor materials include resorcinol, phenol resin, melamine-formaldehyde gel, poly(furfuryl alcohol), poly(acrylonitrile), sucrose, petroleum pitch, and the like. Other polymerizable benzenes, quinones, and similar compounds can also be used as carbon precursors and are known to those skilled in the art.

B. Inert Templating Nanoparticles

The nanorings of the present invention are made using a plurality of nanoparticles dispersed in an aqueous solution or other solvent, optionally coated and/or mixed with a catalyst. The nanoparticles serve as a template for forming structural features of the carbon nanorings. The inert templating nanoparticles are sized and configured to form desirably shaped carbon nanorings. In a preferred embodiment, the nanoparticles are spherical and assist in forming nanorings. The inert templating nanoparticles typically have a diameter between about 1 and about 100 nm, and more preferably between about 10 and about 50 nm.

The inert templating particles can be made from any material so long as the particles can be dispersed in the carbon precursor. Suitable materials for forming inert templating nanoparticles include inorganic oxides such as silica, alumina, magnesium oxide, magnesium hydroxide, zeolites, ceria, and the like, alone or in combination. Many colloidal solutions of these compounds are commercially available. Alternatively, some of the foregoing inert templating particles, such as silica, can be prepared using a sol-gel reaction (i.e., hydrolysis and condensation reaction). For example, silica based colloids can be created using a silicate such as tetraethoxy orthosilicate (TEOS) with an acid or base catalyst. Varying the reaction parameters can control the shape and size of the resulting silica particles, as is known in the art.

The templating nanoparticles serve as nucleation sites. The templating particles may have hydroxyl or other functional groups that do not appreciably increase the rate of polymerization and/or carbonization of the carbon precursor.

According to one embodiment, the otherwise inert templating particles are coated and/or mixed with a catalyst to cause the surface of the inert templating particles to catalyze or initiate polymerization and/or carbonization of the carbon precursor. As discussed more fully below, in an exemplary embodiment the catalyst material is deposited on the inert templating nanoparticles by mixing the catalyst material with the nanoparticles.

C. Catalyst Materials for Increasing Polymerization

The catalyst material added to or coated in the inert templating nanoparticles can be any material that can cause or promote polymerization and/or carbonization of the carbon precursor. In a preferred embodiment, the catalyst is a transition metal catalyst material including but not limited to iron, cobalt, or nickel. These transition metal catalysts are particularly useful for catalyzing many of the polymerization and/or carbonization reactions involving the carbon precursors described above.

The catalyst material can be deposited as a fine coating on the inert templating nanoparticles, or the catalyst material can form small catalyst nanoparticles on the inert templating nanoparticles. The catalyst atoms are typically added to the dispersed inert templating nanoparticles as a metal salt. Suitable metal salts include nitrates of transition metals, such as nitrates of iron, cobalt, or nickel. Other salts of the above mentioned catalyst material can be used and are known to those skilled in the art.

D. Surfactants

If desired, surfactants can be added to the precursor solution to homogeneously disperse the inert templating nanoparticles. The type of surfactant used typically depends on the surface functional groups of the inert templating nanoparticles. Typically a cation surfactant such as an alkyl trimethylammonium halide can be used with inert templating nanoparticles having a negatively charged surface (e.g., silica). Neutral surfactants, such as oleic acids and alkyl amines, are typically useful with inert templating nanoparticles having a neutral surface, and anion surfactants, such as sodium alkyl sulfates and sodium alkyl phosphates, are typically useful with inert templating nanoparticles having a positively charged surface.

Specific examples of suitable surfactants that can be used with silica include, but are not limited to, cetyltrimethylammonium chloride (CTAC), cetyltrimethylammonium bromide (CTAB), tetradecyltrimethylammonium bromide, tetradecyltrimethylammonium chloride, dodecyltrimethylammonium bromide, dodecyltrimethylammonium chloride, and the like. Other surfactants can also be used with the present invention and are known to those skilled in the art.

III. Manufacturing Carbon Nanorings

Carbon nanorings according to the present invention can be manufactured using all or a portion of the following steps: (i) providing a plurality of dispersed templating nanoparticles that can form a seed or nucleation site for polymerization of a carbon precursor; (ii) mixing the plurality of templating nanoparticles (e.g., silica sol) with a carbon precursor (e.g., resorcinol-formaldehyde gel) and allowing the carbon precursor to polymerize to form a plurality of intermediate nanostructures; (iii) carbonizing the intermediate nanostructures to form a plurality of composite nanostructures; and (iv) removing the inert templating nanoparticles from the plurality of composite nanostructures to yield carbon nanorings.

A. Providing Templating Nanoparticles

In one embodiment, the templating nanoparticles are provided as a dispersion or in suitable form that allows dispersion within the carbon precursor. The templating nanoparticles are typically provided as a silica sol.

In an alternative embodiment, the otherwise inert templating nanoparticles are coated or mixed with a catalyst. In this embodiment, the nanoparticles are typically manufactured by first dissolving a metal salt (e.g., $Fe(NO_3)_3$) in water. A base is added (e.g., concentrated aqueous ammonia) to adjust the pH of the solution to between about 8 and about 13, and more preferably between about 10 and about 11. While the metal salt can be deposited on the nanoparticles at a pH as low as a pH of 1, the foregoing pH ranges help to precipitate the metal ions to the surface of the nanoparticles. The evenly and finely divided catalysts atoms can be advantageous by causing more even polymerization and/or carbonization of the carbon precursor around the nanoparticles.

The dispersed templating nanoparticles (e.g., a silica sol) are added to the solution or slurry of dispersed catalyst particles in a manner that maintains the dispersion of the nanoparticles. A small amount of surfactant can also be added to the solution of catalyst atoms before mixing in the templating nanoparticles to assist in stabilizing the dispersion of templating nanoparticles in the solution.

While it can be advantageous to have a homogenous dispersion of the catalyst atoms that finely coat the otherwise inert templating nanoparticles, the present invention also includes forming small particles of catalyst atoms on the inert nanoparticles. Whether small particles form on the inert templating nanoparticles or whether the catalyst is deposited as a fine dispersion depends in part on the particular catalyst atoms being used and on the conditions of the solutions. For example, pH and salt concentrations are known to affect precipitation of catalyst atoms.

B. Polymerizing the Carbon Precursor

The templating nanoparticles are mixed with a carbon precursor (e.g., resorcinol-formaldehyde gel) under conditions suitable for the carbon precursor to polymerize around the templating nanoparticles. In the case where a catalyst is mixed with or deposited on the templating particles, the catalyst may accelerate and/or initiate polymerization of the carbon precursor.

The precursor composition is allowed to cure for sufficient time such that a plurality of intermediate carbon nanostructures are formed around the templating nanoparticles. The time needed to form intermediate nanostructures depends on the temperature, the type and concentration of the catalyst material, the pH of the solution, and the type of carbon precursor being used. During polymerization, the intermediate carbon nanostructures can be individual organic structures or an association of nanostructures that break apart during carbonization and/or removal of amorphous carbon.

Ammonia added to adjust the pH can also effect polymerization by increasing the rate of polymerization and by increasing the amount of cross linking that occurs between precursor molecules.

In an exemplary embodiment the polymerization is not allowed to continue to completion. Terminating the curing process before the entire solution is polymerized can help to form a plurality of intermediate nanostructures that will result in individual nanostructures, rather than a single mass of carbonized material. However, the present invention includes embodiments where the carbon precursor forms a plurality of intermediate carbon nanostructures that are linked or partially linked to one another. In this embodiment, individual nanostructures are formed during carbonization and/or during the removal of amorphous carbon.

An example of suitable conditions for polymerization of resorcinol-formaldehyde gel includes an iron catalyst coated on silica sol, a solution pH of 1-14, solution temperatures between 0° C. and 90° C., and cure time of less than 1 hour to about 72 hours. Those skilled in the art can readily determine the conditions necessary to cure other carbon precursors under the same or different parameters.

Forming intermediate carbon nanostructures from the dispersion of templating nanoparticles causes formation of a plurality of intermediate carbon nanostructures having unique shapes and sizes. Ultimately, the properties of the nanostructure depend at least in part on the shape and size of the intermediate carbon nanostructure. Because of the unique shapes and sizes of the intermediate carbon nanostructures, the final nanostructures can have beneficial properties such as high surface area and high porosity, among others.

C. Carbonizing the Intermediate Nanostructures

Once the intermediate nanostructures are obtained, they are carbonized by heating to produce composite nanostructures. In an exemplary embodiment, the carbon nanostructures are heated to a temperature between about 500° C. and about 2500° C. During the heating process, atoms such as oxygen and nitrogen are volatilized or otherwise removed from the intermediate nanostructure and the carbon atoms are rearranged to form a carbon based structure.

In a preferred embodiment, the carbonizing step produces a graphite based nanostructure. The graphite based nanostructure has carbon atoms arranged in sheets of $sp^2$ hybridized carbon atoms. The graphitic layers can provide unique and beneficial properties, such as electrical conduction and structural strength and/or rigidity.

D. Removing the Nanoparticles

In a final step, the inert templating nanoparticles, catalyst, and/or amorphous (i.e., non-graphitic) carbon are removed from the composite nanostructures. Typically, the inert templating nanoparticles are removed using acids or bases such as nitric acid, hydrogen fluoride, or sodium hydroxide. The method of removing the templating nanoparticles depends on the type of templating nanoparticle or catalyst atoms in the composite. For example, to remove silica nanoparticles, the composite nanostructures can be stirred in 3M NaOH solution for about 6-10 hours. Catalyst atoms or particles (e.g., iron particles or atoms) can typically be removed by refluxing the composite nanostructures in 5.0 M nitric acid solution for about 3-6 hours.

Any removal process can be used to remove the templating nanoparticles so long as the removal process does not completely destroy the carbon nanoring structure. In some cases it can be beneficial to at least partially remove some of the carbonaceous material from the intermediate nanostructure during the removal process. For example, in one embodiment of the present invention, a spherical nanoparticle is used to form a carbon nanoring. It is not presently known at what point in the method that the annular shape is formed, whether it is during the polymerization step, carbonation step, or nanoparticle removal step.

IV. Carbon Nanorings

The methods of the present invention produce a carbon nanoring having useful properties such as unique shape, size, and electrical properties. The carbon nanorings can be a regular or irregularly shaped annular structure having a hole therethrough. The carbon nanorings have high porosity, high surface area, and/or a high degree of graphitization. Carbon nanorings as set forth herein can be substituted for carbon nanotubes, which are typically far more expensive.

The size of the annular structure is determined in large part by the size of the templating nanoparticles used to manufacture the carbon nanorings. Because the carbon nanorings form around the templating nanoparticles, the hole or inner diameter of the carbon nanorings typically corresponds to the outer diameter of the templating nanoparticles. The inner diameter of the carbon nanorings can be between 0.5 nm to about 90 nm. For certain applications such as fuel cells, the inner diameter is preferably between about 1 nm and about 50 nm.

Figure 1B:
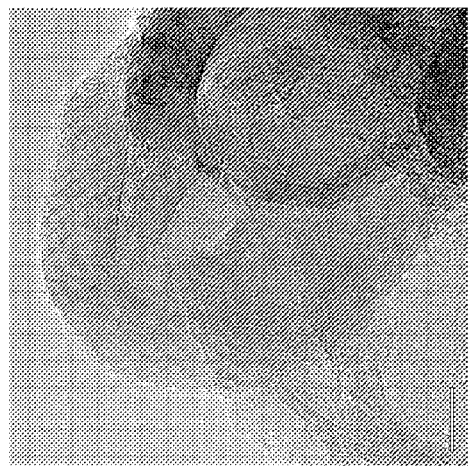
FIG. 1B is a high resolution TEM image showing a close-up of various nanorings of FIG. 1A.
Figure 1A:
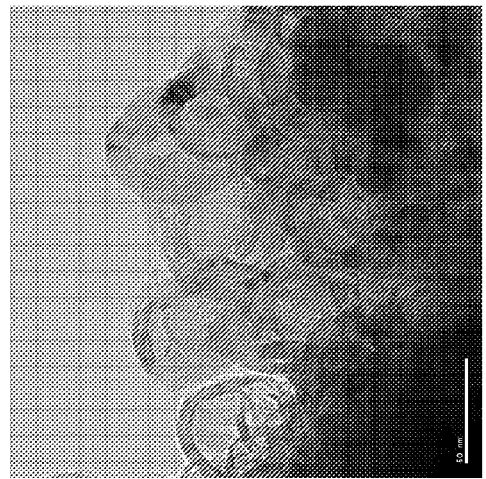
FIG. 1A is a high resolution TEM image of a plurality of nanorings formed according to exemplary embodiments of the present invention.

FIGS. 1A, 1B, and 1C show TEM images of exemplary carbon nanorings made according to the methods of the present invention, the details of which are described in Example 1 below. The generally annular shape of the carbon nanorings is shown in the TEM images. The outer ring diameter is between about 20 nm and about 60 nm, the pore size is about 10 nm to about 40 nm, and the thickness of the ring is about 10 nm. However, the present invention includes carbon nanorings having larger and smaller diameters. Typically, the carbon nanorings have an outer diameter that is less than about 100 nm to maintain structural integrity.

The thickness of the carbon nanoring wall is measured from the inside diameter of the wall to the outside diameter of the wall. The thickness of the carbon nanoring can be varied during manufacture by limiting the extent of polymerization and/or carbonization of the carbon precursor as described above. Typically, the thickness of the carbon nanoring wall is between about 1 nm and 20 nm. However, thicker and thinner walls can be made if desired. The advantage of making a thicker wall is greater structural integrity. The advantage of making a thinner wall is greater surface area and porosity. In the embodiments shown in FIGS. 1A, 1B, and 1C, the carbon nanorings have a wall thickness of about 10 nm.

The wall of the carbon nanoring can also be formed from multiple graphitic layers. The TEM images in FIGS. 1A, 1B, and 1C clearly shows multiple layers. The wall of the carbon nanoring shown in FIG. 1C has about 19 graphite layers with 0.343 nm spacing. In an exemplary embodiment, the carbon nanorings have walls have between about 2 and about 100 graphite layers, more preferably between about 5 and 50 graphite layers and more preferably between about 10 and 20 graphite layers. The number of graphitic layers can be varied by varying the thickness of the carbon nanoring wall as discussed above.

The 0.343 nm spacing between graphite layers shown in FIG. 1C is very similar to the spacing between graphite layers in multi-walled carbon nanotubes. This carbon layer spacing in the carbon nanorings is believed to give them beneficial properties that are similar to the benefits of multi-walled carbon nanotubes (e.g., excellent conductivity). Carbon nanorings can be substituted for carbon nanotubes and used in virtually any application where carbon nanotubes can be used but often with predictably superior results.

The carbon nanorings also have a desired length. The length of the carbon nanoring is the length of the hole as measure along the axis of the hole. If the carbon nanoring is lying flat or horizontal, the length of the nanoring is the height of the nanoring. In a preferred embodiment, the length of the carbon nanoring is limited by forming the nanorings from substantially spherical inert templating nanoparticles. Carbon nanorings formed from spherical inert templating nanoparticles typically can only have a length that is less than or about equal to the outer diameter of the nanoring. Such a result can be obtained because of the substantially even polymerization about the inert templating nanoparticle. The length typically does not exceed the outer diameter of the carbon nanoring because the length and the outer diameter typically grow at substantially the same rate during polymerization. Carbon nanorings that have a length that is less than or about equal to the outer diameter can be advantageous because of their large surface area and/or because they can better facilitate diffusion of reactants and reaction products as compared to e.g., carbon nanotubes.

Another feature of the carbon nanorings of the present invention is the formation of a non-tubular wall. As shown in the TEM images of FIGS. 1A, 1B, and 1C, the graphitic layers form a substantially solid wall. This is in contrast to attempts by others to make a carbon nanoring where the ends of a nanotube are connected to make a ring. Nanorings having tubular walls create undesirable strain that can affect structural integrity and other properties of the nanoring. For example, reports in the literature suggest that kinks in the ring shaped nanotubes prevent formation of nanorings smaller than 70 nm in diameter. In any event, the term "carbon nanoring" shall exclude ring-like structures formed by joining opposite ends of a carbon nanotube.

In addition to good electron transfer, the carbon nanorings of the present invention have high porosity and large surface areas. Adsorption and desorption isotherms indicate that the carbon nanorings form a mesoporous material. The BET specific surface area of the carbon nanorings can be between about 80 and about 400 $m^2/g$ and is preferably greater than about 120 $m^2/g$, and is typically about 200 $m^2/g$, which is significantly higher than the typical 100 $m^2/g$ observed for carbon nanotubes.

V. Carbon Nanoring Supported Catalysts

The high surface area and high porosity make the carbon nanorings of the present invention useful as a support material for fuel cell catalysts. The carbon nanorings can be used as a support material with any catalyst that is suitable for use with carbon supports. In an exemplary embodiment, the catalyst material is a noble metal or an alloy or mixture of noble metals such as an alloy or mixture of platinum and ruthenium.

In general, suitable catalyst materials for oxidation of hydrogen or light alcohol include platinum and platinum-base alloys or mixtures. Preferred metals include those selected from Group VIB, preferably Cr; Group VIIIB, preferably Fe, Ru, Co, or Pd; and/or Group IVA, preferably Sn. The metals are formed into nanometer sized particles to obtain desired catalytic activity. Preferably, the catalyst particles have an average size less than about 50 nm, more preferably less than about 10 nm, and most preferably less than about 5 nm. The catalyst nanoparticles are loaded on the support with a metal loading of about 0.1-80 wt %. The foregoing catalysts have activity and stability suitable for catalyzing the electrochemical oxidation of hydrogen and light alcohol at the anode as well as oxygen reduction at the cathode for PEMFC and DAFC.

Figure 2:
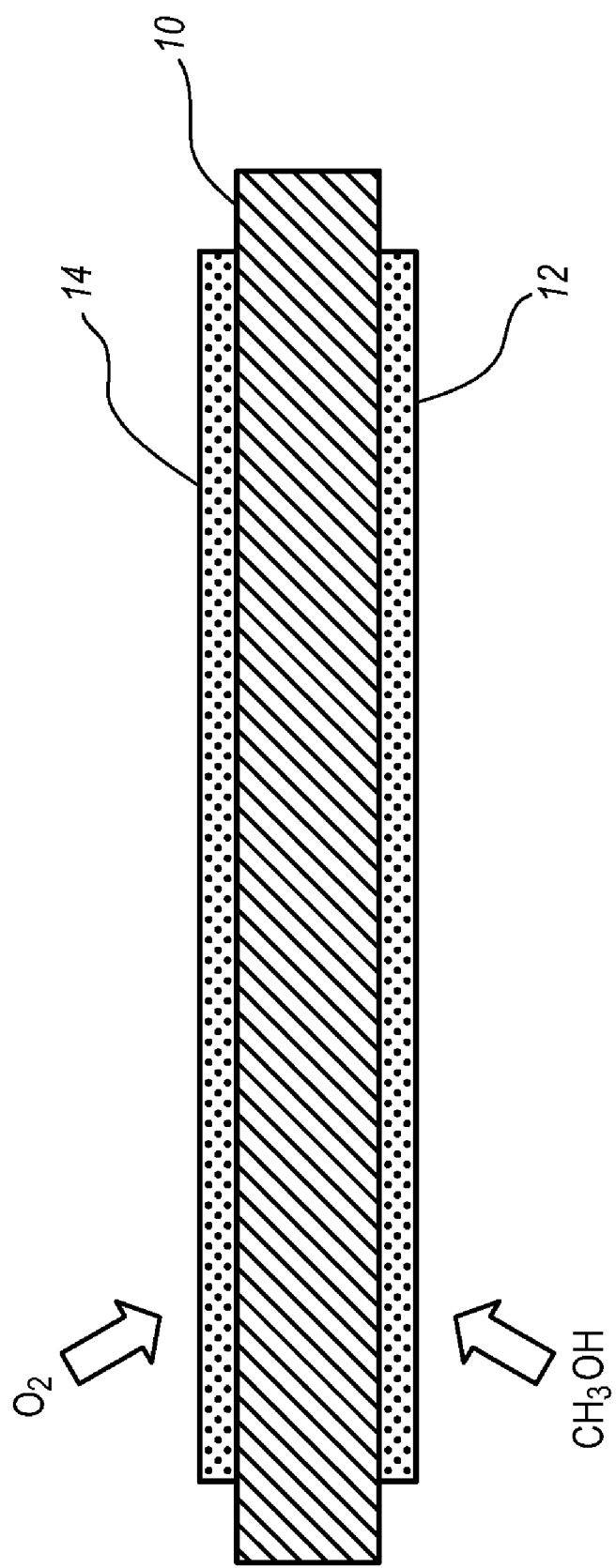
FIG. 2 is a schematic cross-sectional view of a fuel cell electrode membrane assembly according to one embodiment of the present invention.

FIG. 2 schematically shows the structure of an exemplary fuel cell electrode assembly, which includes an electrolyte layer 10, fuel electrode 12 (i.e., the anode) and oxygen electrode 14 (i.e., the cathode). Electrolyte layer 10 is a material suitable for conducting ions. Electrode 12 and/or electrode 14 include a carbon nanoring supported fuel cell catalyst. Electrolyte layer 10 can be any material capable of conducting ions (e.g., a polymer electrolyte). The polymers are selected to be chemically stable and compatible with the fuel cell catalyst to avoid poisoning the catalyst. Suitable polymers include, for example, polyethylene oxide, poly(ethylene succinate), poly (β-propiolactone), and sulfonated fluoropolymers such as Nafion® (DuPont Chemicals, Wilmington, Del.).

Fuel electrode 12 and oxygen electrode 14 include a catalyst suitable for carrying out each half cell reaction. Appropriate catalysts for fuel cells generally depend on the reactants selected. Suitable catalyst materials for oxidation of hydrogen or light alcohol include platinum and platinum-based alloys or mixtures. Preferred metals used alone or in combination include those selected from Group VIB, preferably Cr; Group VIIIB, preferably Fe, Ru, Co, Pt, or Pd; and/or Group IVA, preferably Sn. The metals may comprise nanometer sized particles to obtain desirable catalytic activity (e.g., preferably, less than about 50 nm, more preferably less than about 10 nm, and most preferably less than about 5 nm).

The catalyst nanoparticles in fuel electrode 12 and/or oxygen electrode 14 are supported on a carbon nanoring support. Supporting the catalyst with carbon nanorings typically includes impregnating or otherwise depositing the nanoparticles on the nanoring using a solvent or carrier. Solvents or carriers suitable for depositing the catalyst particles on the nanoring support include ethylene glycol, methanol, ethanol, acetone, water, and the like.

The carbon nanoring supported catalyst is deposited on the electrolyte membrane to form an electrode. The carbon nanoring supported catalyst can be deposited directly on the electrolyte, or it can be mixed with an electrode material. In one embodiment, the carbon nanoring supported catalyst is mixed with a curable composition that is applied to the electrolyte layer. Fillers and other components can be added to the electrode material to give it desired properties such as conductivity and gas permeability. Electrodes 12 and 14 can be further modified by laying an additional conductive layer and/or by applying a conductive plate to the layer of nanoring supported catalyst. The electrodes 12 and 14 and electrolyte 10 form a membrane electrode assembly. Those skilled in the art of fuel cells are familiar with techniques for incorporating the membrane electrode assembly into a fuel cell to generate electricity.

Figure 3:
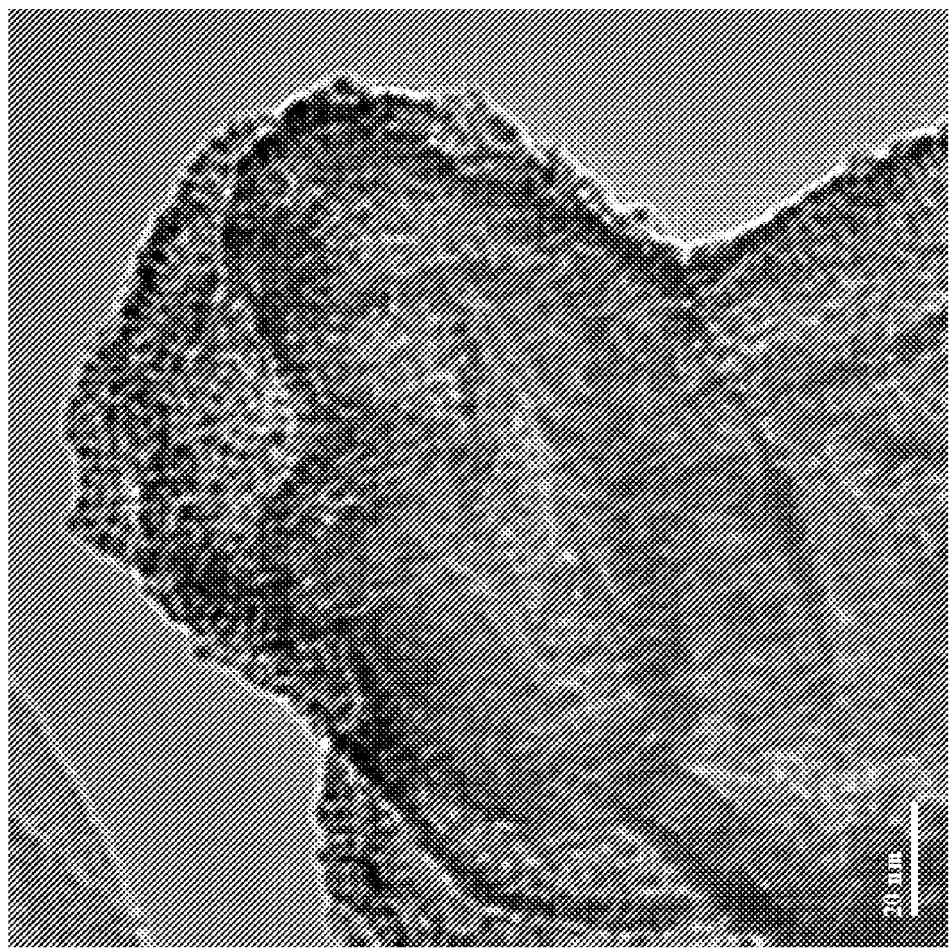
FIG. 3 is a high resolution TEM of a platinum-ruthenium catalyst supported on a nanoring support of the present invention.

FIG. 3 is a high resolution TEM image of a platinum-ruthenium catalyst supported on carbon nanorings. As shown in FIG. 3, the catalyst material (i.e., the platinum-ruthenium particles) is uniformly distributed on the outside surface of the carbon nanorings. The platinum-ruthenium particle size is about 2 nm to about 5 nm. Consequently, the particles are not distributed between the graphite layers of the carbon nanoring wall since the interlayer distance is only about 0.343 nm.

Fuel cell catalysts supported on the carbon nanorings of the present invention show significant improvement in power density compared to existing catalysts, which is believed to be due to the improved diffusion of reactants and/or electrons through the support material. As discussed above, diffusion of reactants can be a rate limiting step at the high current density region in high performance fuel cells. Diffusion of reactants is improved using the carbon nanorings because each carbon nanoring has only one relatively large pore. Thus, all the catalyst nanoparticles are supported in and around this pore where reactants can more easily access the catalyst surface. Consequently, the configuration of the pores in carbon nanorings of the present invention provides advantages that would not be present in materials having the same degree of porosity.

Studies using the carbon nanorings as a support material in fuel cells have shown significant improvements in power density in comparison to existing supported fuel cell catalysts. While it is believed that the nanoring supported catalysts perform better because of improvements in mass transfer, electron transfer, and/or catalyst loading (i.e., high surface area) the present invention is not limited by this theory.

The improved fuel cell catalysts of the present invention are particularly advantageous for direct alcohol fuel cells, such as direct methanol fuel cells and direct ethanol fuel cells. The improved support properties are particularly advantageous for these types of fuel cells since direct alcohol fuel cells are typically operated at low temperatures and because the diffusion of alcohols is likely to be slower than the diffusion of hydrogen.

VI. Examples

The following examples provide formulas for making carbon nanorings and for using carbon nanorings in a fuel cell catalyst of a fuel cell. Examples stated in the past tense are actual examples of carbon nanorings, catalysts, and fuel cells that have been manufactured and/or used according to the invention. Examples recited in present tense are hypothetical examples of formulas for making carbon nanorings and/or for using the carbon nanorings in a fuel cell catalyst of a fuel cell. Some examples may include both actual and hypothetical aspects or segments. Even though an example may be hypothetical in nature, or include a hypothetical portion, it should be understood that all examples are based on or extrapolated from actual compositions that have been made and/or tested.

Example 1

Example describes a method for manufacturing carbon nanorings. Catalyst coated nanoparticles were formed by adding an iron nitrate salt to water to make an aqueous solution of $Fe(NO_3)_3$. The pH of the solution was adjusted to a pH of 10-11 using an aqueous solution of concentrated ammonia. A slurry with highly suspended particles was formed. A small amount of a surfactant (CTAB) was then dispersed in the mixture. To this solution, a silica sol of 15 nm particles (AKZO NOBEL), formaldehyde, and resorcinol were added to obtain an aqueous reaction mixture, with an $H_2O$/transition metal salt/resorcinol/formaldehyde/silica molar ratio of 80:0.8:1:2:0.6. The ratio of CTAB to resorcinol was 0.15. The resulting reaction mixture was cured at 80-90° C. for 3 hours in a closed glass vial to produce an intermediate nanostructure. The cured intermediate nanostructure was heated under an inert atmosphere at 800-1000° C. for 1.5 hours to carbonize the intermediate nanostructure. The resulting composite intermediate nanostructure was then stirred in 3M NaOH solution for 6-10 hours to remove the silica particles and then refluxed in 5.0 M $HNO_3$ solution for 3-6 hours to remove the catalyst metal particles. The carbon material obtained was analyzed by TEM.

The size and shape of the nanorings of this example advantageously provide high surface area and high porosity. The carbon nanorings had a pore volume of 0.23 cc/g (adsorption) and 0.25 cc/g (desorption) as measured by the BJH method. The carbon nanorings obtained in this example exhibit properties of mesopores as evidenced by type IV isotherms and an H1 adsorption-desorption hysteresis loop for $N_2$ adsorption and desorption at −196° C.

The BET specific surface area of the carbon nanorings was 195.07 $m^2$/g, which is significantly higher than the 100 $m^2$/g typically observed for carbon nanotubes. The pore volumes of adsorption and desorption measured by BJH method were 0.23 and 0.25 cc/g, respectively. These results indicate that the carbon nanorings made according to this example possess relatively high surface area and have a suitable pore size for accommodating high metal loading and facilitating mass transfer.

Figure 4:
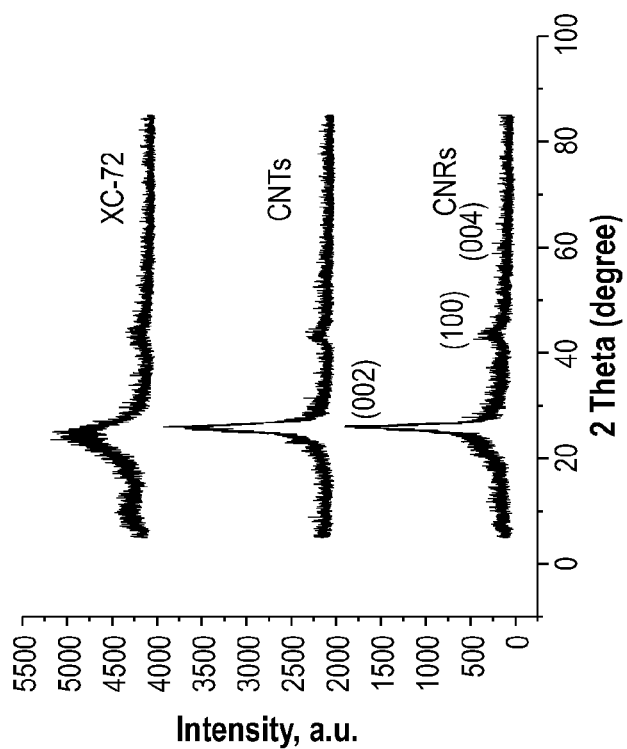
FIG. 4 is a X-ray diffraction pattern of carbon nanorings of the present invention, multi-walled carbon nanotubes, and carbon black (XC-72R)

X-ray diffraction patterns were obtained for the carbon nanorings to show the degree of graphitization. For comparison, X-ray diffraction patterns were also obtained for multi-walled carbon nanotubes (CNTs) and carbon black (XC-72). The results of the X-ray diffraction are shown in FIG. 4. As shown in FIG. 4, the 2θ values for the (002) diffraction peak of the carbon nanorings and the carbon nanotubes are 25.98 and 26.02, respectively. Furthermore, the (002) diffraction peaks of CNTs and CNRs are very sharp as compared to the carbon black (XC-72). The similar diffraction peaks and sharply defined (002) peak in the multi-walled carbon nanotubes and carbon nanorings is indicative of high graphitization and shows that the carbon nanorings have similar graphitic layers as carbon nanotubes. The d-spacing calculated by the Bragg formula for carbon nanorings and carbon nanotubes are 3.43 Å and 3.42 Å, respectively, which is slightly larger than 3.395 Å spacing characteristic of graphitic carbon.

Example 2

Example 2 describes a method for manufacturing catalytic templating particles. In this example, 5.2 g of 28% ammonium hydroxide was added dropwise to a solution of 16.16 g (0.04 mol) of iron (III) nitrate monohydrate in 60 ml of water. The mixture was stirred vigorously until the solution turned homogenous. The pH value of the solution was measured to be about 1-2. To this solution 0.1 g of hexadecyltrimethylammonium bromide was added. A slurry with highly suspended particles was formed. To this mixture was added in sequence 3.6 g (0.1 mol) of a 50% silica colloidal suspension in water (15 nm particle size), 8.1 g of 37% formaldehyde water solution, and 5.5 g (0.05 mol) of resorcinol. This mixture was stirred at 90° C. for 3 hours and then filtered, washed (with water), and dried to yield a yellow solid comprising the polymer and iron salt. The yellow solid was carbonized at 1150° C. for 4 hours under a nitrogen atmosphere to yield a black solid. The black solid was refluxed in 50 ml of 3M sodium hydroxide solution for 6 hours and then in 50 ml of 5M nitric acid for 4 hours.

Example 3

Example 3 describes a method for manufacturing carbon nanorings. In this example, carbon nanorings were manufactured using the same procedure as Example 1, except that 8.08 g (0.02 mol) of iron nitrate monohydrate was used to form the catalyst on the silica nanoparticles.

Example 4

Example 4 describes a method for manufacturing carbon nanorings. In this example, carbon nanorings were manufactured using the same procedure as Example 2, except that the yellow solid, which includes polymer and iron salt, was carbonized at 850° C. for 4 hours.

Example 5

Example 5 describes a method for manufacturing carbon nanorings. In this example, a metal salt solution was prepared by dissolving 1.9 g of iron acetate in 10 g of water. To this solution 0.932 g of silica colloid (neutral) and 5.2 g of hexadecyltrimethylammonium bromide was added and stirred vigorously. The silica particles were 15 nm. The pH was then adjusted to 10 using 17.5 g of $NH_4OH$ (28%-30% in water). 5.35 g of water was added for a total of 40 g. To this solution or slurry was added 3.05 g of resorcinol and 4.5 g of formaldehyde (37% in water). The resulting slurry was cured at 80-90° C. for 3 hours. The resulting solid was collected and dried in an oven at 70° C. for two hours. The dried solid was carbonized at 800° C. for 3 hours to yield a carbon powder. The carbon powder was washed in 3M NaOH for 6 hours to remove the silica and then refluxed in 5 M $HNO_3$ for 5 hours to remove metal salts. Additional washes with 4M HCl at 90° C. were performed until residual iron had been removed. The sample was then washed with water and dried in an oven at 70° C. for 3 hours.

Example 6

Example 6 describes a method for manufacturing carbon nanorings. In this example, a carbon precursor solution was prepared by mixing 3.05 g of resorcinol and 4.5 g of formaldehyde (37% in water). To this solution was added 40 ml of an iron solution under nitrogen flow (iron in citric acid, 0.01 mol in 100 ml of water). Then 20 ml of $NH_4OH$ (28%-29% in water) was added to adjust the pH to 10, while stirring vigorously and under nitrogen flow. Silica nanoparticles having a particle size of 15 nm were added to the mixture. The resulting slurry was cured at 80-90° C. for 3 hours to yield a solid. The solid was collected and dried in an oven at 70° C. for 2 hours. The solid was carbonized at 800° C. for 3 hours under nitrogen flow to yield a carbon powder. The carbon powder was washed in 3M NaOH for 6 hours to remove the silica and then refluxed in 5 M $HNO_3$ for 5 hours to remove the catalyst. Additional washes were performed using 4 M HCl and mixtures of (water/$H_2SO_4$/$KMNO_4$ 1:0.01:0.003) at 90° C. for 2 to remove iron ions and amorphous material. The sample was then washed with water and dried in an oven at 70° C. for 3 hours.

Example 7

Example 7 describes a method for manufacturing carbon nanorings. In this example, a 40 ml iron solution (iron in citric acid, 0.01 mol in 100 ml of water) was prepared, to which 0.0932 g of hexadecyltrimethylammonium bromide was added, followed by the addition of 0.932 g of silica colloid (acidic, pH<4, particle size 15 nm), while stirring. The final pH of the solution was measured to be 3.5. To this solution was added 3.05 g of resorcinol and 4.5 g of formaldehyde (37% in water) to yield a slurry. The slurry was cured at 80-90° C. for 3 hours to yield a solid. The solid was collected and dried in an oven at 70° C. for 2 hours. The solid was then carbonized at 800° C. for 3 hours under nitrogen flow to yield a carbon powder. The carbon powder was washed in 3M NaOH for 6 hours to remove silica and refluxed in 5 M $HNO_3$ to remove metal ions. The sample was washed with water and dried in an oven at 70° C. for 3 hours.

Example 8

Example 8 describes various methods for making carbon nanorings. Carbon nanorings are manufactured according to each of Examples 1-7 to manufacture carbon nanorings using a silica colloid, but varying the particle size in each method to variously have a particle size of 4 nm, then 10 nm, then 20 nm, and finally 100 nm.

Example 9

Example 9 describes a fuel cell manufactured using carbon nanorings manufactured according to Example 1. In this example, a carbon nanoring supported platinum-ruthenium catalyst was prepared using ethylene glycol. Proper amounts of chloroplatinic acid (0.800 g) and ruthenium chloride (0.426 g) were dissolved in ethylene glycol (MW 62.07) and then mixed with a slurry of carbon nanorings (0.550 g) suspended in ethylene glycol. The mixture was stirred for 0.5 hours. Then a solution of sodium hydroxide and ethylene glycol was added until the pH value reached 13. The resulting mixture was heated to 160° C. at a heating rate of 5° C./min and held at 160° C. for 3 hours. A flow of nitrogen was passed through the reaction system to prevent the reduced species from oxidation. After the mixture was cooled to room temperature, it was filtered, washed with copious deionized water, then dried at 70° C. in a vacuum. The sample obtained was 30 wt % Pt-15 wt % Ru/CNR (atomic ratio of 1:1 Pt:Ru).

The carbon nanoring supported catalyst was then loaded on a pretreated Nafion® 115 electrolyte membrane and tested as an anode catalyst. For the cathode, a commercially available 20 wt % Pt/C catalyst (Johnson Matthey) was used. For comparison purposes, a commercially available platinum-ruthenium catalyst having 30wt % Pt-15 wt % Ru on carbon black (Johnson Matthey) was tested as an anode catalyst. Both anode catalysts (i.e., the nanoring catalyst and the commercial Pt—Ru catalyst) were loaded on respective electrolyte membranes with 2 mg/$cm^2$. The cathode catalyst was loaded on the electrolyte membranes at 1.0 mg/$cm^2$.

Figure 5:
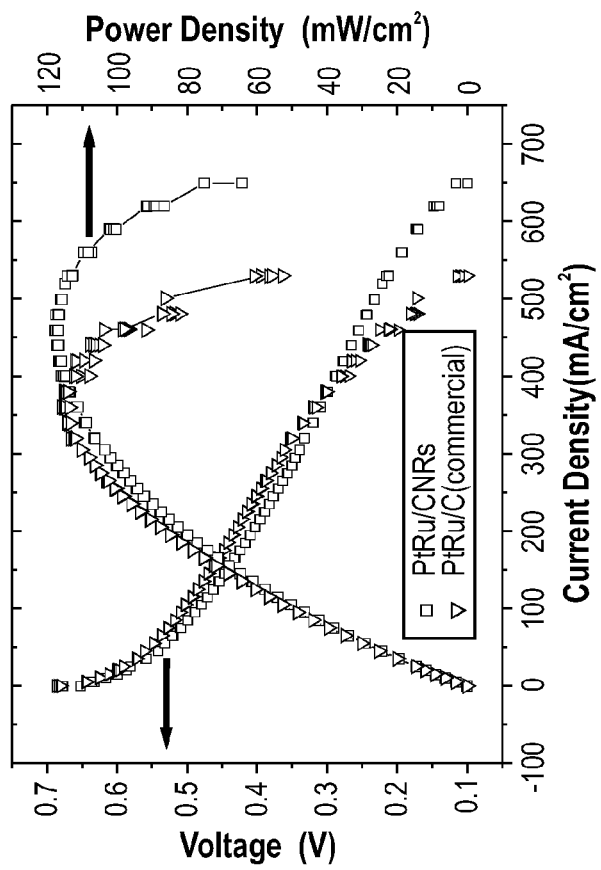
FIG. 5 is a graph showing current density versus voltage and power density for a commercially available catalyst and for a carbon nanoring supported fuel cell catalyst according to the present invention.

FIG. 5 is a graph showing current density vs. voltage and power density for the Pt—Ru nanoring supported catalyst and the commercial Pt—Ru catalyst. The fuel cell was tested by allowing the current density to increase from 0.0 mA/$cm^2$ to 650.0 mA/$cm^2$. The nanoring supported catalyst reached a maximum power density of 118.7 mW/$cm^2$ at a current density of 479.8 mA/$cm^2$. Furthermore, for the nanoring supported catalyst, no mass transfer polarization is apparent from the data. In contrast, the carbon(XC-72)-supported commercial catalyst shows the typical mass transfer polarization at about 420 mA/$cm^2$. These test results indicate that the fuel cell catalyst supported on a carbon nanoring can obtain higher power density at higher current density than currently existing fuel cell catalysts and that the nanoring supported catalysts are better able to diffuse reactants and reaction products.

Example 10

Example 10 describes various fuel cells manufactured using carbon nanorings manufactured according to Examples 2-8. In Example 10, the fuel cells are manufactured by preparing carbon nanorings according to Examples 2-8, respectively. The fuel cells of Example 10 are further prepared by supporting a platinum-ruthenium catalyst on the carbon nanoring and incorporating the supported catalyst into an electrode as described in Example 9.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method of manufacturing carbon nanorings, comprising:
   (i) forming a plurality of intermediate carbon nanostructures by polymerizing a carbon precursor in the presence of a plurality of inert templating nanoparticles and an iron catalyst, wherein the inert templating nanoparticles comprise an inorganic oxide;
   (ii) carbonizing the intermediate carbon nanostructures to form a plurality of intermediate composite nanostructures; and
   (iii) removing the inert templating nanoparticles from the intermediate composite nanostructures to yield carbon nanorings comprised of at least one graphitic carbon layer forming a closed ring-like nanostructure and having a hole therethrough.

2. A method as in claim 1, wherein the inert templating nanoparticles comprise silica.

3. A method as in claim 1, wherein the inert templating nanoparticles are at least partially mixed with a transition metal catalyst, including at least the iron catalyst, to yield catalytic templating particles comprising the inert templating nanoparticles and the transition metal catalyst.

4. A method as in claim 3, further comprising adding a surfactant to a mixture containing the transition metal catalyst before mixing in the inert templating nanoparticles and forming the plurality of intermediate carbon nanostructures, wherein the transition metal catalyst optionally includes one or more of cobalt or nickel in addition to the iron catalyst.

5. A method as in claim 1, wherein the carbon precursor comprises one or more of resorcinol-formaldehyde-gel, phenol resin, melamine-formaldehyde gel, poly(furfuryl alcohol), poly(acrylonitrile), sucrose, resorcinol, petroleum pitch, benzenes or quinones.

6. A method as in claim 1, wherein carbonization is carried out at a temperature in a range of about 500° C. to about 2500° C.

7. A method as in claim 1, wherein the templating nanoparticles are removed from the composite nanostructure by etching with an acid, a base, or both.

8. A method as in claim 1, wherein the templating nanoparticles are substantially spherical.

9. A method as in claim 1, wherein the inert templating nanoparticles comprise one or more of silica, alumina, magnesium oxide, magnesium hydroxide, zeolites or ceria.

10. A method as in claim 1, wherein the inert templating nanoparticles have a diameter between about 10 nm and about 50 nm.

11. A method as in claim 1, further comprising placing metal catalyst particles on the carbon nanorings to yield a fuel cell catalyst.

12. A method as in claim 11, wherein the metal catalyst particles comprise at least one noble metal.

13. A method of manufacturing carbon nanorings, comprising:
   (i) forming a plurality of intermediate carbon nanostructures by:
      forming a mixture comprising a solvent and a catalyst material comprising iron;
      adding a surfactant to the mixture to disperse the catalyst material and form a dispersed mixture of catalyst material;
      combining the dispersed mixture of catalyst material with a plurality of inorganic oxide templating nanoparticles and a carbon precursor; and
      polymerizing the carbon precursor in the presence of the plurality of inorganic oxide templating nanoparticles and the catalyst material;
   (ii) carbonizing the intermediate carbon nanostructures to form a plurality of intermediate composite nanostructures; and
   (iii) removing the inorganic oxide templating nanoparticles from the intermediate composite nanostructures to yield carbon nanorings comprised of multiple graphitic carbon layers that form a closed ring-like nanostructure and a hole therethrough.

14. A method as in claim 13, wherein the inorganic oxide templating nanoparticles comprise silica.

15. A method as in claim 13, wherein the catalyst material is mixed with or deposited on the inorganic oxide templating nanoparticles and optionally comprises at least one other transition metal in addition to the iron.

16. A method as in claim 13, wherein the catalyst material is provided in the form of a metal salt.

17. A method as in claim 13, wherein the catalyst material is homogenously dispersed in a solution and then mixed with a base and the surfactant to form dispersed catalyst particles that are subsequently mixed with and/or deposited on a surface of the inorganic oxide templating nanoparticles.

18. A method as in claim 17, wherein the catalyst particles are formed by adjusting the pH of the solution to between about 8 and about 13.

19. A method as in claim 13, wherein the catalyst material comprises catalyst nanoparticles deposited on a surface of the inorganic oxide templating nanoparticles.

20. A method as in claim 13, further comprising placing metal catalyst particles on the carbon nanorings to yield a fuel cell catalyst.

21. A method of making carbon nanorings, comprising:
   (i) forming a plurality of intermediate carbon nanostructures by polymerizing a carbon precursor in the presence of silica templating nanoparticles having a transition metal catalyst material on surfaces thereof, the silica templating nanoparticles having a diameter in a range of about 1 nm to about 100 nm and a metal loading suitable for formation of intermediate carbon nanostructures that yield carbon nanorings after purification;
   (ii) carbonizing the intermediate carbon nanostructures to form a plurality of intermediate composite nanostructures; and
   (iii) removing the silica templating nanoparticles from the intermediate composite nanostructures to yield carbon nanorings having a generally annular shape and being comprised of multiple graphitic carbon layers that form a closed ring-like nanostructure and a hole therethrough.

22. A method as in claim 21, further comprising using a surfactant to disperse the silica templating nanoparticles.

* * * * *